(12) United States Patent
Maruyama et al.

(10) Patent No.: US 7,595,012 B2
(45) Date of Patent: Sep. 29, 2009

(54) INJECTION MOLDING MACHINE AND METHOD OF ADJUSTING CONTROL CONDITION FOR REVERSE ROTATION OF SCREW IN INJECTION MOLDING MACHINE

(75) Inventors: Junpei Maruyama, Yamanashi (JP); Satoshi Takatsugi, Yamanashi (JP); Tatsuhiro Uchiyama, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 52 days.

(21) Appl. No.: 11/937,653

(22) Filed: Nov. 9, 2007

(65) Prior Publication Data
US 2008/0150181 A1 Jun. 26, 2008

(30) Foreign Application Priority Data
Dec. 26, 2006 (JP) .............................. 2006-350342

(51) Int. Cl.
*B29C 45/52* (2006.01)
(52) U.S. Cl. .................... 264/40.1; 264/328.1; 425/145; 425/587
(58) Field of Classification Search ......... 425/145–148, 425/136; 264/40.1, 40.5, 40.7, 328.1
See application file for complete search history.

(56) References Cited

U.S. PATENT DOCUMENTS

| 5,153,149 | A | 10/1992 | Naito et al. |
| 7,074,028 | B2 | 7/2006 | Watanabe et al. |
| 2006/0278014 | A1 | 12/2006 | Okada et al. |

FOREIGN PATENT DOCUMENTS

| DE | 19834086 C1 | 1/2000 |
| EP | 0965428 A2 | 12/1999 |
| EP | 1418040 A2 | 5/2004 |
| JP | 45-2988 | 1/1970 |
| JP | 48-21741 | 3/1973 |
| JP | 49-74252 | 7/1974 |
| JP | 56-113440 A | 2/1980 |
| JP | 62-236720 A | 10/1987 |

(Continued)

OTHER PUBLICATIONS

European Search Report of Patent Application No. 07120443.2-2307 mailed Apr. 29, 2008.

*Primary Examiner*—Jill L Heitbrink
(74) *Attorney, Agent, or Firm*—Lowe, Hauptman, Ham & Berner, LLP

(57) ABSTRACT

In an injection molding machine capable of appropriately adjusting a control condition for a reverse rotation of a screw and a method for adjusting the control condition, molding is repeated with an amount of a reverse rotation of the screw performed after completion of metering and before injection to be varied in each molding cycle. In injection, resin flows backward until a check valve becomes closed. A peak value of a rotational force causing reverse rotation of the screw by the back flow of resin and other physical amounts are detected as indices of resin back-flow amount. An evaluation value of the control condition is obtained by inputting the indices of resin back-flow amount, metering time, etc. into an evaluation function. The value of screw reverse rotation amount with which the highest evaluation value is obtained is set for the screw reverse rotation.

14 Claims, 4 Drawing Sheets

FOREIGN PATENT DOCUMENTS

| | | |
|---|---|---|
| JP | 63-166412 | 10/1988 |
| JP | 01-168421 A | 7/1989 |
| JP | 01-192521 A | 8/1989 |
| JP | 04-284221 A | 10/1992 |
| JP | 11-170319 A | 6/1999 |
| JP | 2003-305758 A | 10/2003 |
| JP | 2004-216808 A | 8/2004 |

INJECTION MOLDING MACHINE AND METHOD OF ADJUSTING CONTROL CONDITION FOR REVERSE ROTATION OF SCREW IN INJECTION MOLDING MACHINE

RELATED APPLICATIONS

The present application is based on, and claims priority from, Japanese Application Number 2006-350342, filed Dec. 26, 2006, the disclosure of which is hereby incorporated by reference herein in its entirety.

BACKGROUND OF THE INVENTION

1. Field of the Invention

The present invention relates to the adjustment of a control condition for a reverse rotation process in an injection molding machine having a check valve at the front end of a screw.

2. Description of Related Art

Injection molding machines, such as in-line screw injection molding machines, having an injection mechanism including a check valve mechanism provided at the front end of a screw for preventing resin from flowing backward during injection are already in use. FIG. 1 shows an example of the check valve mechanism. A screw 1 is inserted in a cylinder 7. At the front end of the screw 1, specifically at a portion reduced in diameter between a screw head 2 and a body of the screw 1, a check valve 3 is provided movably in the direction of a screw axis, and at the reduced-diameter portion, on the side near the body of the screw 1, a check seat 4 is provided. The check valve 3 comes in close contact with the check seat 4, thereby blocking a resin passage.

Resin pellets 8 fed from the back of the screw 1 are melted by shearing heat produced by rotation of the screw 1 and heat produced by a heater provided outside the cylinder 7 in which the screw 1 is inserted. The melted resin causes an increase in resin pressure behind the check valve 3, thereby producing a force pushing the check valve 3 forward. When the check valve 3 is pushed forward, the resin behind flows forward of the check valve 3, through a gap between the check valve 3 and the reduced-diameter portion, thereby increasing the pressure in front of the screw head 2 within the cylinder 7.

When the pressure in front of the check valve 3 exceeds a specified value (back pressure), the screw 1 is pushed backward, so that the pressure in front of the check valve 3 decreases. Further rotation of the screw 1 increases the pressure behind the check valve 3 to become higher than the pressure in front of the check valve 3. Consequently, the melted resin is fed forward of the check valve 3, continuously. When the screw 1 moves backward up to a specified position, the rotation of the screw 1 is stopped (metering process).

Then, in an injection process, when the screw 1 is moved forward (from the right to the left in FIG. 1) to inject resin, the pressure of the resin stored in front of the screw head 2 increases, so that the check valve 3 moves backward and comes in close contact with the check seat 4, thereby blocking the resin passage to prevent the melted resin from flowing backward (as indicated by an arrow F), i.e., in the direction of backward motion of the screw, due to injection pressure. Variation in timing at which the check valve 3 moving backward blocks the resin passage results in variation in the amount of resin injected, which leads to unstable molding.

In the injection process, the check valve mechanism is closed by the pressure in front of the check valve mechanism which is increased by the forward motion of the screw 1 to become higher than the pressure behind. Immediately before injection, however, there is residual pressure behind the check valve mechanism, in grooves 6 between flights 5, as mentioned above, and such residual pressure causes variation in timing of blocking. After the start of injection until the check valve blocks the resin passage, resin flows backward from in front of the check valve to behind occurs. Thus, the variation in blocking timing results in variation in volume injected per cycle, which affects the quality of products molded.

In this connection, there is known an invention in which a step of rotating the screw in the opposite direction to the direction that the screw is rotated in the metering process is added after the completion of the metering process and before the injection/pressure holding process, so that injection is performed after the screw is rotated reversely (see JP45-2988B, JP56-113440A, and JP01-192521A). Although the reverse rotation of the screw does not always ensure that the check valve is closed at the start of injection, the screw is rotated reversely to ensure that the check valve is closed immediately after injection starts.

For such reverse rotation of the screw, a control condition for reverse rotation, such as reverse rotation amount, reverse rotation speed or the like, needs to be set to an appropriate value.

In connection with a method of determining the control condition for reverse rotation, for example JP04-284221A discloses an invention in which, utilizing the phenomenon that the closure of the check valve during the screw reverse rotation causes a steep increase in pressure of oil supplied to an oil motor for rotating the screw, the reverse rotation of the screw is stopped when torque reaches a specified value during the screw reverse rotation.

JP2003-305758A discloses an invention in which a plurality of sets of values of control conditions for screw reverse rotation (screw reverse rotation time, pressure applied in the direction of screw forward motion, reverse rotation speed and reverse rotation amount) are prepared depending on resin viscosity to allow automatic setting of the control conditions for reverse rotation by selecting one set of values.

If injection is performed with the check valve opened, resin flows backward during the injection, so that torque in the opposite direction to the direction of screw rotation in the metering process (reverse torque) is exerted on the screw. There are known an invention in which the reverse rotation of the screw caused by such reverse torque is prevented by supplying a small amount of hydraulic pressure to a hydraulic motor for rotating the screw (see JP48-21741A and JP49-74252A), an invention in which such rotation of the screw is prevented by feeding a rotational speed instruction 0 to a motor for rotating the screw or performing position control over the motor (see JP62-236720A), and an invention in which such rotation is prevented using a ratchet (see JP63-166412U).

Further, regarding the injection molding machine with the check valve at the front end of the screw, it is known that when the check valve becomes closed during injection, reverse torque ceases to be exerted on the screw.

For example, JP11-170319A discloses an invention in which, at the start of injection, the reverse rotation of the screw is prevented by applying a braking force, and when the screw moves forward a specified distance, it is determined that the check valve is closed and the force braking the screw rotation is removed, since the closure of the check valve stops reverse torque being exerted on the screw.

Further, JP2004-216808A discloses an invention in which injection is started allowing the screw to rotate in either direction, so that at the start of injection, the screw rotates reversely due to the back flow of resin. In the present invention, the closure of the check valve is detected by detecting the stop of the screw reverse rotation, since the closure of the check valve stops reverse torque being exerted on the screw.

Further, JP01-168421A disclose a technique of detecting an abnormality by detecting a reverse torque exceeding an allowable range, which technique is based on the fact that an increase in resin back flow in the injection/pressure holding process due to wear of the check valve, etc. results in an increase in reverse torque on the screw in the injection/pressure holding process.

Variation in back-flow amount due to resin back flow produced during injection results in variation in the amount of resin injected into a mold and affects the quality of products molded. Thus, it is necessary to rotate the screw reversely, thereby producing a pressure difference between in front of and behind the check valve, thereby causing the check valve to be moved and closed or to be more likely to be closed. For this, it is desired to obtain a more suitable value of the control condition for screw reverse rotation.

Insufficient reverse rotation amount in this screw reverse rotation process results in an increase in back-flow amount in injection and affects the quality of products molded. Conversely, excessive reverse rotation amount causes the resin behind the check valve to be sent backward more than required, which results in an increase in metering time, and therefore an increase in cycle time.

As mentioned above, in the invention disclosed in JP04-284221A, utilizing the phenomenon that the closure of the check valve during the screw reverse rotation causes a steep increase in pressure of oil supplied to the oil motor for rotating the screw, the reverse rotation of the screw is stopped when torque reaches a specified value during the screw reverse rotation. There are, however, cases that, due to the type of resin, the reverse rotation of the screw is not enough to cause the closure of the check valve, or the closure of the ring during the screw reverse rotation does not cause an increase in reverse torque. Thus, the invention disclosed in JP04-284221A has a problem that an optimal value of the control condition for screw reverse rotation is difficult to obtain.

In the invention disclosed in JP2003-305785A, values of control conditions for screw reverse rotation are determined depending only on resin viscosity. The optimal value of reverse rotation amount, however, varies depending on the shape of the mold, the shape of the screw, the stroke of the check valve, and other conditions. Thus, the method disclosed in JP2003-305758A has a problem that the reverse rotation amount is not always adjusted to an optimal value.

SUMMARY OF THE INVENTION

The present invention provides an injection molding machine allowing the adjustment of a control condition for screw reverse rotation to a more suitable value and a method of adjusting the control condition for the reverse rotation process in the injection molding machine.

The injection molding machine of the present invention has a screw provided with a check valve, rotational drive means for driving the screw to rotate, axial drive means for driving the screw to move axially and rotational force detection means for detecting a rotational force exerted on the screw, and performs a reverse rotation process of rotating the screw in a direction opposite to a direction of rotation of the screw in a metering process, on a control condition, after completion of the metering process and before start of an injection process. The injection molding machine comprises: back-flow amount index detection means that detects one or more physical amounts indicative of state of a molding operation and serving as indices of a back-flow amount of resin flowing backward through the check valve during a forward motion of the screw, evaluation value calculation means that obtains an evaluation value by inputting the detected physical amounts as the indices of the back-flow amount to an evaluation function for evaluating the control condition of the reverse rotation process, and control condition selection means that repeats molding operations with a set value of the control condition of the reverse rotation process varied within a predetermined range, and selects a value of the control condition with which the highest evaluation value is obtained by the evaluation value calculation means, to be set for the reverse rotation processes in continuous molding operations.

The back-flow amount index detection means may detect one or more of physical amounts of: a peak value of the rotational force detected by the rotational force detection means during the forward motion of the screw, an integrated value of the rotational force with respect to time from the time when the screw starts the advancing motion to the time when the rotational force peaks, an integrated value of the rotational force with respect to a position of the screw from a position where the screw starts the advancing motion to a position where the rotational force peaks, the position of the screw, a distance of advancing motion of the screw from the start of the advancing motion to the position where the rotational force peaks, a time period from the time when the screw starts the advancing motion to the time when the rotational force peaks, a pressure exerted on the screw in a direction of backward motion of the screw when a predetermined time period elapses after the start of the forward motion of the screw, and a pressure exerted on the screw in the direction of backward motion of the screw when the screw is moved to a predetermined position, as the indices of the back-flow amount.

The injection molding machine may further comprise means for detecting at least one of a metering time period and a metering torque, wherein the evaluation value calculation means obtains an evaluation value by using detected values of the at least one of the metering time period and the metering torque as variables of the evaluation function in addition to the indices of back-flow amount.

The evaluation function may be $$\sum_i a_i X_i^{b_i}$$

($i \geq 1$, $a1 \neq 0$, $b1 \neq 0$, X1 is a variable such as an index of back-flow amount), or $$\prod_i X_i^{c_i}$$

($i \geq 1$, $c1 \neq 0$, X1 is a variable such as an index of back-flow amount).

The control condition of the reverse rotation process may be one or a combination of two of a time period, a speed and an amount of the reverse rotation of the screw.

The forward motion of the screw may be performed for injection/pressure holding processes, or may be performed between the completion of the metering process and the start of the injection process.

A method of the present invention is provided for adjusting a control condition of a reverse rotation process in an injection molding machine having a screw provided with a check valve, rotational drive means for driving the screw to rotate, axial drive means for driving the screw to move axially and rotational force detection means for detecting a rotational force exerted on the screw, and that performs the reverse rotation process of rotating the screw in a direction opposite to a direction of rotation of the screw in a metering process, on the control condition, after completion of the metering process and before start of an injection process. The method comprises the steps of: (a) performing a molding cycle on the control condition of the reverse rotation process, (b) detecting one or more physical amounts indicative of state of molding operation and serving as indices of a back-flow amount of resin flowing backward through the check valve during a forward motion of the screw, (c) obtaining an evaluation value by inputting the detected physical amounts as the indices of the back-flow amount into an evaluation function, (d) changing the control condition for the reverse rotation process, and (e) repeating the steps (a) to (d) with a set value of the control condition for the reverse rotation process varied, and selecting a value of the control condition with which the highest evaluation value is obtained, to be set for the reverse rotation process.

The step (b) may include a step of detecting one or more of physical amounts of: a peak value of the rotational force detected by the rotational force detection means during the forward motion of the screw, an integrated value of the rotational force with respect to time from the time when the screw starts the advancing motion to the time when the rotational force peaks, an integrated value of the rotational force with respect to a position of the screw from a position where the screw starts the advancing motion to a position where the rotational force peaks, the position of the screw, a distance of advancing motion of the screw from the start of the advancing motion to the position where the rotational force peaks, a time period from the time when the screw starts the advancing motion to the time when the rotational force peaks, a pressure exerted on the screw in a direction of backward motion of the screw when a predetermined time period elapses after the start of the forward motion of the screw, and a pressure exerted on the screw in the direction of backward motion of the screw when the screw is moved to a predetermined position, as the indices of the back-flow amount.

The method may further comprise a step of obtaining at least one of metering time and a metering torque, and the step (c) may comprise a step of obtaining the evaluation value by using the at least one of the metering time period and the metering torque as variables of the evaluation function.

The evaluation function used in the step (c) may be $$\sum_i a_i X_i^{b_i}$$

($i \geq 1$, $a1 \neq 0$, $B1 \neq 0$, X1 is a variable such as an index of back-flow amount), or $$\prod_i X_i^{c_i}$$

($i \geq 1$, $C1 \neq 0$, X1 is a variable such as an index of back-flow amount).

The control condition of the reverse rotation process may be one or a combination of two of a time period, a speed and an amount of the reverse rotation of the screw.

The step (b) may comprise a step of detecting the one or more physical amounts during the forward motion of the screw in the injection process/pressure holding process, or between the completion of the metering process and the start of the injection process.

Through obtaining an index of resin back-flow amount during forward motion of the screw, the present invention makes it possible to obtain the optimal value of the control condition for the screw reverse rotation process which holds resin back-flow amount at a low level and does not result in a useless increase in metering time. Thus, even when the resin and/or mold is replaced or the molding conditions are changed, the optimal value of the control condition for the screw reverse rotation process, adapted for the resin, mold and molding conditions now adopted can be obtained.

DETAILED DESCRIPTION

First, the principle of operation of the present invention will be explained.

The screw reverse rotation process performed after the completion of metering and before the injection/pressure holding process is intended to cause the check valve provided at the front end of the screw to be closed or to be likely to be closed. As mentioned above, insufficient screw reverse rotation amount causes a delay in closure of the check valve in injection, thereby causing an increase in resin back-flow amount. Conversely, excessive screw reverse rotation amount results in a decrease in resin back-flow amount, but causes an increase in metering time and therefore an increase in cycle time. Thus, it is necessary to determine the control condition for the screw reverse rotation more appropriately so as to hold resin back-flow amount at a low level and not to cause an increase in metering time.

FIG. 2 is an explanatory diagram showing the states which the check valve mechanism takes at the completion of the metering process, during reverse rotation of a screw, and at the start of forward motion of the screw (injection), successively.

Figure 1:
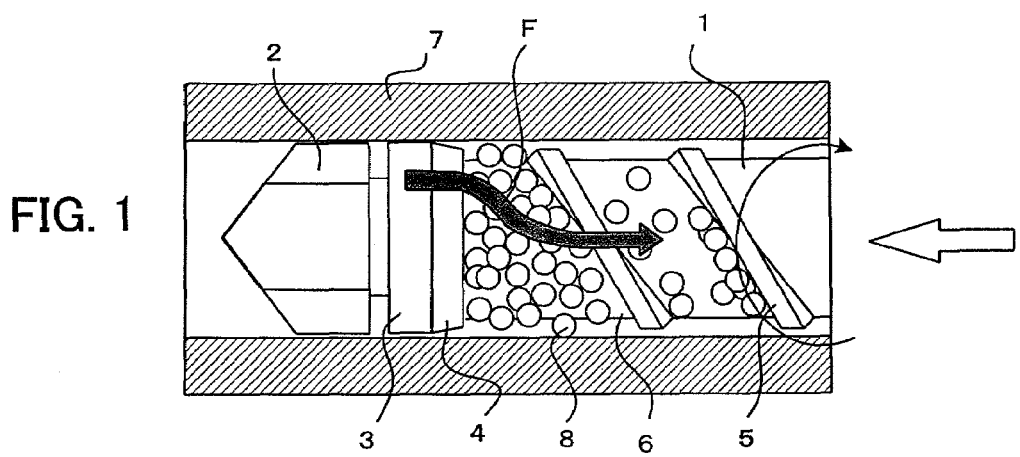
FIG. 1 is an explanatory diagram relating to an example of a check valve mechanism.
Figure 2A:
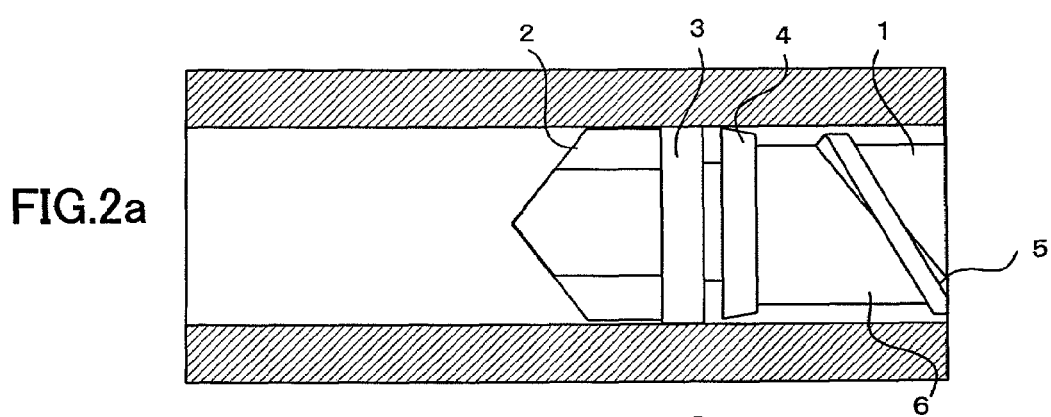
FIGS. 2a-c are explanatory diagrams showing the states which the check valve mechanism takes at the completion of a metering process, during reverse rotation of a screw, and at the start of forward motion of the screw (injection), successively.

FIG. 2a shows the position of the screw and the state of the check valve mechanism at the completion of the metering process. Melted resin is stored in front of the screw head 2 within the cylinder 7. The screw 1 is in retracted position. In the metering process, resin melted by rotation of the screw causes an increase in resin pressure behind the check valve 3, thereby producing a force pushing the check valve 3 forward.

Consequently, the check valve 3 is pushed forward, so that the melted resin flows forward of the check valve 3, through a gap between the check valve 3 and the reduced-diameter portion of the screw. As shown in FIG. 2a, at the time when the metering process is completed, the check valve 3 is in forward position, i.e., the check valve mechanism is in open position, so that the passage for melted resin is not blocked.

Figure 2B:
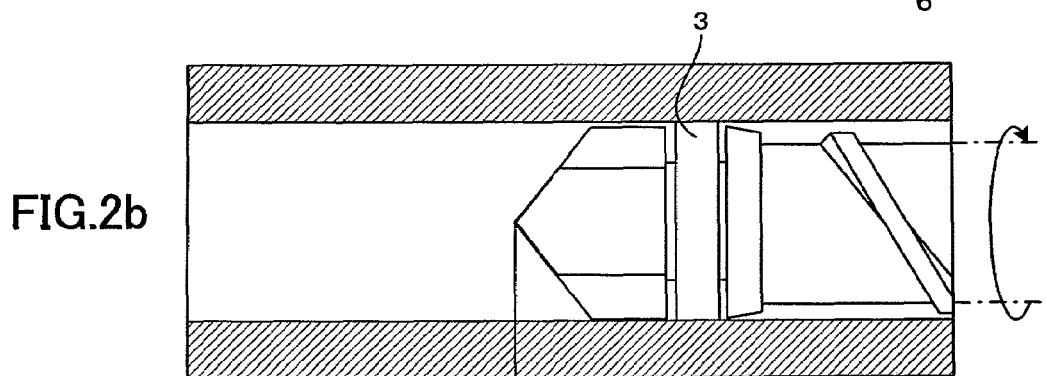

FIG. 2b shows how the check valve 3 is caused to move backward to be likely to be closed, by rotating the screw reversely after the completion of metering, thereby causing a decrease in resin pressure behind the check valve 3.

Figure 2C:
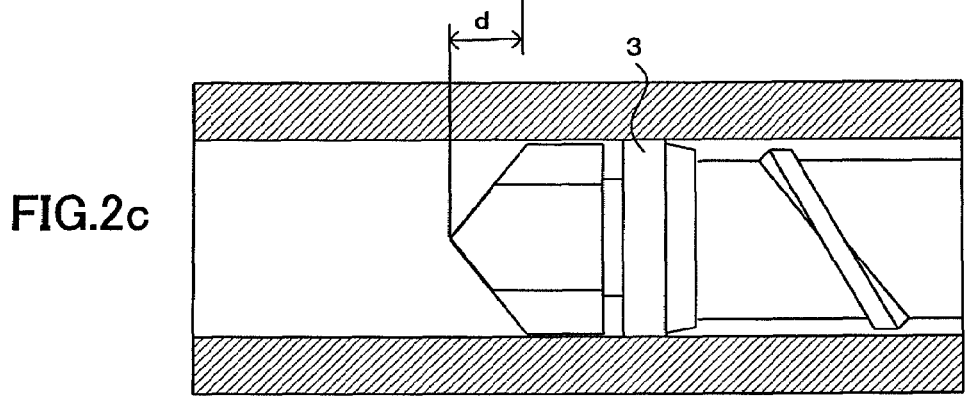

FIG. 2c shows the state at the time when the start of forward motion of the screw 1 (injection) causes the closure of the check valve 3. The distance d indicated in FIGS. 2b and 2c is the distance that the screw 1 moves after the start of forward motion (injection) before the closure of the check valve 3, in which period, resin flows backward.

If the value of the control condition for the screw reverse rotation shown in FIG. 2b is not appropriate so that the screw reverse rotation amount is too small, it results in slow movement of the check valve 3 in injection, and therefore a delay in closure of the check valve 3 (increase in screw movement distance d indicated in FIGS. 2b and 2c), which results in an increase in resin back-flow amount in injection, and therefore a decrease in the amount of resin injected into the mold. Conversely, if the screw reverse rotation amount is excessively large, it results in a decrease in resin back-flow amount in injection but leads to an increase in metering time.

The screw reverse rotation process can be added also when a pre-injection screw movement step, i.e., the step of moving the screw forward prior to the start of injection is performed after the completion of the metering process. Specifically, at the completion of metering, the check valve of the check valve mechanism is in open position as shown in FIG. 2a. Then, as shown in FIG. 2b, the check valve is caused to be likely to be closed, by rotating the screw reversely, and then, the screw is moved forward as the pre-injection screw movement step. The forward motion of the screw in this pre-injection screw movement step causes the closure of the check valve. In this case, FIG. 2c is considered to show the check valve caused to block the resin passage by the screw forward motion in the pre-injection screw movement step.

Also in this pre-injection screw movement step, back flow of resin occurs between the start of the screw forward motion and the closure of the check valve 3, and if the value of the control condition for the screw reverse rotation is not appropriate, it results in variation in resin back-flow amount in this pre-injection screw movement step, and therefore variation in the amount of resin packed in the mold by injection, which affects the quality of products molded and leads to an increase in metering time.

Thus, in the present invention, values of indices of resin back-flow amount in screw forward motion are obtained on the control condition for screw reverse rotation (screw reverse rotation amount (rotation angle)) which is varied, and each value of the varied control condition is evaluated using an evaluation function prepared to evaluate the screw reverse rotation process on the basis of the above-mentioned indices, to find a value of the control condition for screw reverse rotation corresponding to the highest evaluation value.

⟨Indices of Resin Back-Flow Amount in Screw Forward Motion⟩

Figure 3:
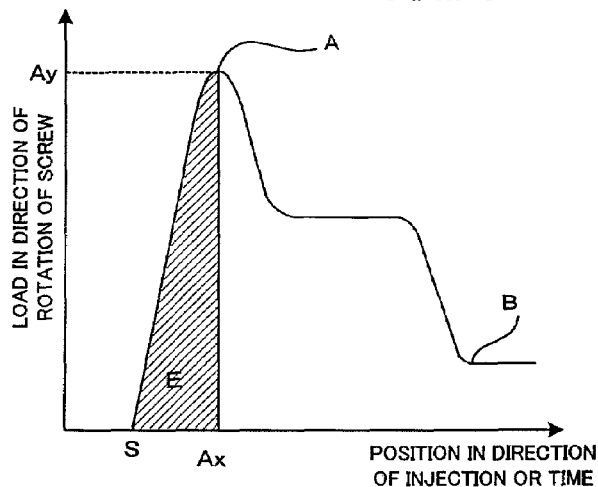
FIG. 3 is a graph showing how the load exerted on the screw in the direction of screw rotation varies as the screw is moved forward.

FIG. 3 is a graph showing how the load exerted on the screw in the direction of screw rotation varies when the screw is moved forward, where time or screw position in the direction of injection is plotted on the horizontal axis and load in the direction of screw rotation is plotted on the vertical axis.

In FIG. 3, point S is a screw forward motion start point. The forward motion of the screw 1 produces back flow F of resin through a gap between the check valve 3 and the check seat 4. The resin flowing backward exerts a pressure on flights 5 of the screw 1, so that a load which tends to cause reverse rotation of the screw is exerted on the screw, as in the metering process. As the screw 1 is moved forward, the load in the direction of reverse rotation increases. After a while, when the check valve 3 is closed, back flow stops so that the load in the direction of reverse rotation stops increasing and starts decreasing. At this time, the load in the direction of reverse rotation takes a peak value. The time when the load takes a peak value indicates a check valve closure time.

(1) The peak value of the load in the direction of screw reverse rotation is an index of back-flow amount The load in the direction of screw reverse rotation continues increasing until the check valve is closed (until the screw moves through distance d indicated in FIGS. 2b and 2c). Thus, late closure of the check valve results in a high peak value of the load in the direction of screw reverse rotation. Late closure of the check valve means an increased amount of resin back flow. Thus, the height (magnitude) of the peak value of the load in the direction of screw reverse rotation serves as an index of resin back-flow amount, where higher peak value of the load in the direction of screw reverse rotation indicates greater back-flow amount.

(2) The time-related integrated value of the load in the direction of screw reverse rotation obtained up to the time when the load takes a peak value is an index of back-flow amount Even with the same peak value of the load in the direction of screw reverse rotation, longer time that has elapsed before the load in the direction of screw reverse rotation takes a peak value results in a larger amount of resin back flow. Thus, also the time-related integrated value of the load in the direction of screw reverse rotation obtained over the range between the time when the screw starts the forward motion and the time when the load takes a peak value serves as an index of back-flow amount, where greater time-related integrated value of the load in the direction of screw reverse rotation indicates greater back-flow amount.

(3) The position-related integrated value of the load in the direction of screw reverse rotation obtained up to the screw position where the load takes a peak value is an index of back-flow amount Even with the same peak value of the load in the direction of screw reverse rotation, longer distance that the screw moves before the load in the direction of screw reverse rotation takes a peak value results in a larger amount of resin back flow. Thus, also the screw-position-related integrated value of the load in the direction of screw reverse rotation obtained over the range between the screw position where the screw starts the forward motion and the screw position where the load takes a peak value serves as an index of back-flow amount, where greater screw-position-related integrated value of the load in the direction of screw reverse rotation indicates greater back-flow amount.

(4) The position of the screw when the load in the direction of screw reverse rotation takes a peak value, or the distance that the screw moves before the load in the direction of screw reverse rotation takes a peak value is an index of back-flow amount While the indices (1) to (3) of back-flow amount are each obtained on the basis of the load in the direction of screw reverse rotation exerted on the screw during the forward motion of the screw, another physical amount detected when the load in the direction of screw reverse rotation takes a peak value (the back-flow prevention value is closed) can also be used as an index of resin back-flow amount.

Later closure of the check valve results in greater distance that the screw moves forward before the check valve is closed. Thus, the position of the screw when the load in the direction of screw reverse rotation takes a peak value, or the distance that the screw moves before the load in the direction of screw reverse rotation takes a peak value can also be used as an index of resin back-flow amount. In this case, more forward position of the screw when the load in the direction of screw reverse rotation takes a peak value indicates greater back-flow amount, and greater distance that the screw moves before the load in the direction of screw reverse rotation takes a peak value indicates greater back-flow amount.

(5) The time that has elapsed before the load in the direction of screw reverse rotation takes a peak value is an index of back-flow amount Later closure of the check valve means longer time that has elapsed before the closure of the back-flow prevention value. Thus, the time that has elapsed before the load in the direction of screw reverse rotation takes a peak value can also be used as an index of back-flow amount, where longer time that has elapsed before the load in the direction of screw reverse rotation takes a peak value indicates greater back-flow amount.

(6) Injection pressure at reference screw position, or injection pressure after reference time is an index of back-flow Amount Apart from the above-mentioned indices, the below-mentioned amounts can be used as an index of resin back-flow amount.

Early closure of the check valve (therefore, a decreased amount of back flow) results in early rise in injection pressure, while late closure of the check valve (therefore, an increased amount of back flow) results in late rise in injection pressure. Thus, the injection pressure at a specified screw position or the injection pressure a specified time after the start of the forward motion of the screw can also be used as an index of back-flow amount.

For example, it is possible to set reference screw position and use the injection pressure at the time when the screw reaches the reference screw position during the forward motion, as an index of back-flow amount. In this case, higher injection pressure indicates smaller back-flow amount.

Further, it is possible to set reference time and use the injection pressure the reference time after the start of the forward motion of the screw, as an index of back-flow amount. In this case, higher injection pressure indicates smaller back-flow amount.

It is possible to set a plurality of reference screw positions or a plurality of reference times.

⟨In the Case where the Peak Value Cannot be Obtained⟩

When the check valve is already closed at the start of the forward motion of the screw, or when the check valve does not become closed during the forward motion of the screw, the load in the direction of screw reverse rotation may not show a peak value. In such case, the indices such as the peak value of the load in the direction of screw reverse rotation, the distance that the screw moves before the load in the direction of screw reverse rotation takes a peak value, etc. cannot be obtained. Even in such case, however, the injection pressure at the reference screw position or the injection pressure the reference time after the start of the forward motion of the screw can be obtained.

There are cases where the load in the direction of screw reverse rotation shows two or more peak values (for example, the load varies describing two peaks). As a response to such case, it is conceivable to refrain from obtaining an index of back-flow amount and present a message to that effect on a display device, or obtain an index of back-flow amount on the basis of the last peak value in time, or obtain an index of back-flow amount on the basis of the above-mentioned injection pressure at the reference screw position or injection pressure the reference time after the start of the forward motion of the screw.

⟨Evaluation Function⟩

Evaluation function such as $$\sum_i a_i X_i^{b_i} \quad (1)$$

($i \geq 1$, $a1 \neq 0$, $b1 \neq 0$, Xi is an index of back-flow amount) or $$\prod_i X_i^{c_i} \quad (2)$$

($i \geq 1$, $c1 \neq 0$, xi is an index of back-flow amount) can be used.

It is to be noted that since at least one index of back-flow amount needs to be given as an input variable, the evaluation functions (1) and (2) each include an input variable Xi which is an index of back-flow amount, where $a1 \neq 0$, $b1 \neq 0$ and $c1 \neq 0$. Two or more indices of back-flow amount may be given as input variables.

In addition to the indices of back-flow amount, at least one of metering time and metering torque can be given as an input variable. As mentioned above, excessive screw reverse rotation amount causes the resin behind the check valve to be sent backward more than required, which results in an increase in metering time. Thus, the metering time is a parameter usable to evaluate the control condition for screw reverse rotation, and therefore can be used as an input variable to the evaluation function, in addition to the indices of back-flow amount.

Further, an increase in screw reverse rotation amount tends to cause the resin on flights at the front part of the screw to be sent backward, thereby causing a decrease of resin on the flights at the front part of the screw. Metering operation with the resin decreased on the flights at the front part of the screw tends to cause a decrease in torque (metering torque) exerted on the screw, particularly at the start of metering. Thus, also the metering torque is a parameter usable to evaluate the control condition for screw reverse rotation, and therefore can be used as an input variable to the evaluation function, in addition to the indices of back-flow amount.

Suppose that four amounts:
peak value of rotational force (index of back-flow amount)
distance that the screw moves after the start of injection before the rotational force takes a peak value (index of back-flow amount)
metering time
metering torque are input variables to the evaluation function, and therefore, Xi in the evaluation functions (1) and (2) are:
X1: peak value of rotational force
X2: distance that the screw moves after the start of injection before the rotational force takes a peak value X3: metering time X4: metering torque If the evaluation function (1) is used, $$a1X1^{b1}+a2X2^{b2}+a3X3^{b3}+a4X4^{b4}$$

(a1, a2, a3, a4, b1, b2, b3, b4 are weighting coefficients for the respective input variables, a1≠0, a2≠0, a3≠0, a4≠0, b1≠0, b2≠0, b3≠0, b4≠0)

If the evaluation function (2) is used, $$X1^{c1} \times X2^{c2} \times X3^{c3} \times X4^{c4}$$

(c1, c2, c3, c4 are weighting coefficients for the respective input variables, c1≠0, c2≠0, c3≠0, c4≠0)

It is to be noted that, as shown as expressions (3) and (4) below, the evaluation function can be prepared to allow N number in all of input variables, namely all the variables that can be given as indices of back-flow amount plus two other variables, i.e., metering time and metering torque, where weighting coefficients ai, bi, ci for the variables not used in evaluation are set to 0.

$$a1X1^{b1}+a2X2^{b2}+\ldots+aiXi^{bi}+\ldots+aNXN^{bN} \quad (3)$$

or $$X1^{c1} \times X2^{c2} \times \ldots \times Xi^{ci} \times \ldots \times XN^{cN} \quad (4)$$

⟨Adjustment of Control Condition for Screw Reverse Rotation (1)⟩

First, an explanation will be given using an example in which

X1: peak value of rotational force

X2: distance that the screw moves after the start of injection before the rotational force takes a peak value are input variables to the evaluation function.

Generally, an increase in screw reverse rotation amount (control condition for screw reverse rotation) results in earlier closure of the check valve, and therefore a decrease in back-flow amount. Thus, as understood from the description given above, an increase in screw reverse rotation amount brings about changes as indicated below:

X1→decreasing

X2→decreasing

Suppose that the above-mentioned X1 (peak value of rotational force) and X2 (distance that the screw moves after the start of injection before the rotational force takes a peak value) are given as input variables to the evaluation function (1), where b1=1 and b2=1. The evaluation function is expressed as $$a1X1+a2X2 \quad (5)$$

(a1, a2 are weighting coefficients for the respective input variables, A1>0, a2>0)

As mentioned above, with an increase in screw rotation amount, X1 and X2 decrease, so that the value of the evaluation function (5), i.e., $a1X1^{b1}+a2X2^{b2}$ decreases. Thus, it is possible to obtain values of the evaluation function (5) for the screw reverse rotation amount gradually increased, and adjust the screw reverse rotation amount to a value corresponding to the smallest value of the evaluation function (5).

In this case, further increase in screw reverse rotation amount results in the closure of the check valve. Once the check valve is closed, further increase in screw reverse rotation amount causes no change to the check valve closed. Thus, the decreasing of X1 (peak value of rotational force) and X2 (distance that the screw moves after the start of injection before the rotational force takes a peak value) reaches a plateau, so that the decreasing of the value of the evaluation function (5) reaches a plateau. When the decreasing of the value of the evaluation function has reached a plateau so that the check valve is considered to be closed, further increase in reverse rotation amount is useless and results in an increase in metering time, as mentioned above. Thus, the screw reverse rotation amount is adjusted to a value corresponding to the plateau of the evaluation function.

⟨Adjustment of Control Condition for Screw Reverse Rotation (2)⟩

Next, an explanation will be given of an example in which

X1: peak value of rotational force

X2: distance that the screw moves after the start of injection before the rotational force takes a peak value X3: metering time X4: metering torque are input variables to the evaluation function.

As mentioned above, increase in screw reverse rotation amount brings about a change in X1 and X2 as indicated below:

X1→descending

X2→descending

Meanwhile, increase in screw reverse rotation amount results in an increase in metering time, i.e., brings about a change in X3 as indicated below:

X3→increasing

Further, increase in screw reverse rotation amount tends to cause the resin on the flights at the front part of the screw to be sent backward, thereby causing a decrease of resin on the flights at the front part of the screw. Metering operation with the resin decreased on the flights at the front part of the screw tends to cause a decrease in torque (metering torque) exerted on the screw, particularly at the start of metering. Thus, increase in screw reverse rotation amount brings about a change in X4 as indicated below:

X4→decreasing

To sum up, an increase in screw reverse rotation amount causes a decrease in the indices of back-flow amount (X1, X2), an increase in metering time (X3), and a decrease in metering toque (X4). In order to decrease the back-flow amount, the screw reverse rotation amount should be increased, which, however, causes an increase in metering time and a decrease in metering torque. Since an increase in metering time leads to an increase in cycle time, increase in metering time more than required is undesirable. Further, decrease in metering torque, particularly at the start of metering indicates that the resin which should be on the flights at the front part of the screw has been brought backward, and the resin brought backward more than required is also undesirable.

Thus, although an increase in screw reverse rotation amount brings about a decrease in back-flow amount, consideration is required, in obtaining an appropriate value of screw reverse rotation amount, to avoid an excessive increase in metering time and an excessive decrease in metering torque.

Thus, evaluation is performed with an evaluation function involving metering time and metering torque as input variables added.

Suppose that X1 (peak value of rotational force), X2 (distance that the screw moves after the start of injection before the rotational force takes a peak value), X3 (metering time)

and X4 (metering torque) are input variables to the evaluation amount (1), where b1=1, b2=1, b3=1 and b4=1. The evaluation function is expressed as $$a1X1+a2X2+a3X3+a4X4 \quad (6)$$

(a1, a2, a3, a4 are weighting coefficients for the respective input variables, a1>0, a2>0, a3>0, a4<0)

It is to be noted that, in the evaluation function (6), since X4 (metering torque) tends to decrease with an increase in screw reverse rotation amount, the weighting coefficient for it is negative (a4<0).

With an increase in screw rotation amount, the value of (a1X1+a2X2) of the evaluation function (6) decreases and the value of (a3X3+a4X4) increases. While the decreasing of the value of (a1X1+a2X2) reaches a plateau as mentioned above, the value of (a3X3+a4X4) continues increasing with an increase in screw reverse rotation amount (While the value of a3X3 is positive and continues increasing, the value of a4X4 is negative and the absolute value of a4X4 continues decreasing. Consequently, the value of (a3X3+a4X4) continues increasing.) Thus, with an increase in screw reverse rotation amount, the value of the evaluation function (6) first decreases, and then, stops decreasing and starts increasing. The value of the evaluation function is smallest at the stationary point where it stops decreasing and starts increasing. Thus, it is possible to obtain the stationary point and adjust the screw reverse rotation amount to the value at the stationary point.

As mentioned above, increase in screw reverse rotation amount tends to cause the resin on the flights at the front part of the screw to be sent backward. Sometimes such resin sent backward causes an increase in metering torque. In such case, the weighting coefficient for the metering torque in the evaluation function should be set to a positive value (for example, a4>0 in the evaluation function (6)). Like this, the sign of the weighting coefficient for each input variable in the evaluation function can be determined, depending on whether the input variable increases or decreases with an increase in screw reverse rotation amount.

Either of the above-described examples can be arranged such that the range within which the screw reverse rotation amount should be adjusted is specified in advance, and that the screw reverse rotation amount is adjusted to a value at the point where the evaluation function (5) or (6) takes the smallest value within the specified range.

⟨Adjustment of Reverse Rotation Amount as a Control Condition for Screw Reverse Rotation⟩

As a control condition for screw reverse rotation, reverse rotation amount is adjusted, where the adjustment of the reverse rotation amount can be achieved by adjusting one or two parameters selected from among reverse rotation angle, screw reverse rotation time, and screw reverse rotation speed. The reverse rotation amount can be increased by increasing the reverse rotation angle, or by increasing the screw reverse rotation time while fixing the screw reverse rotation speed, or by increasing the screw reverse rotation speed while fixing the screw reverse rotation time. It can be achieved also by changing any two of these parameters.

⟨Embodiment⟩

The above is the explanation of the gist of principle of the present invention. Next, an embodiment of the present invention will be described.

Figure 4:
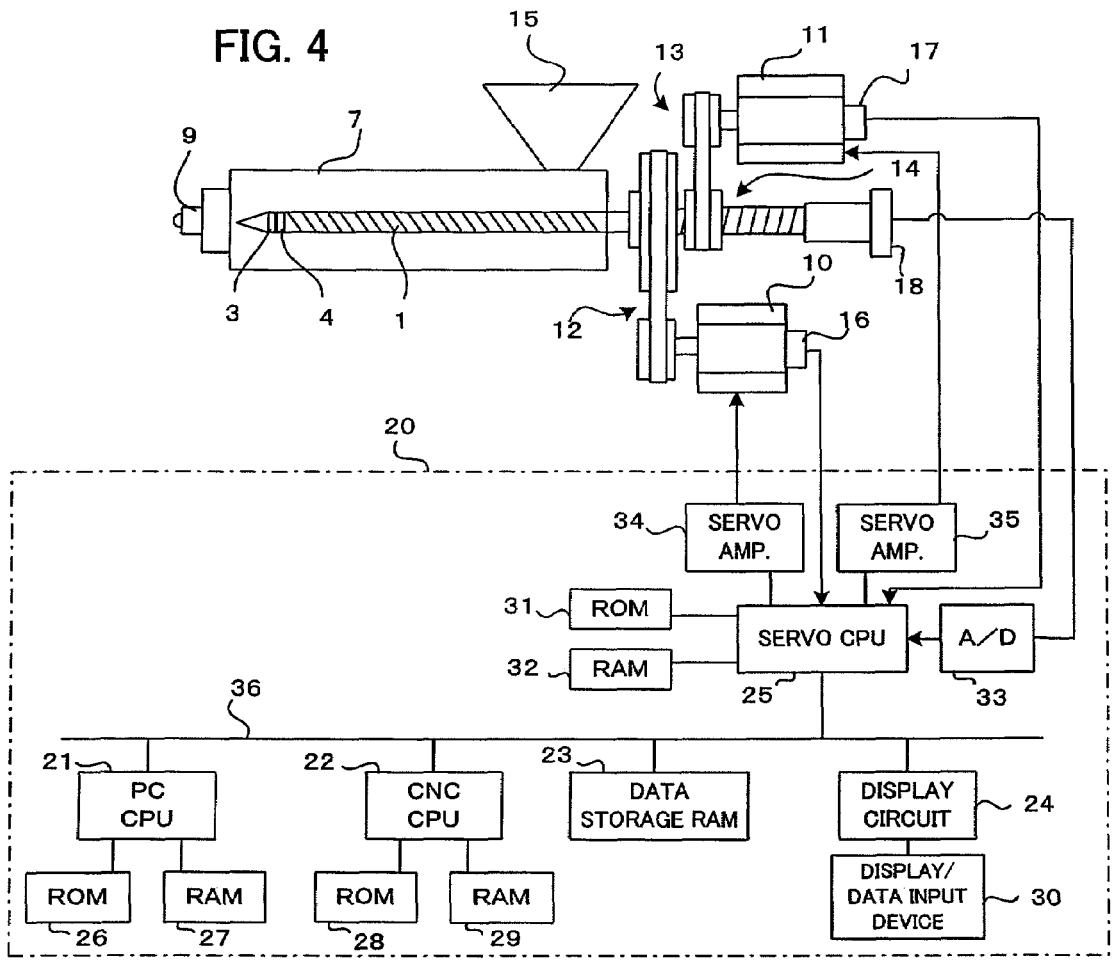
FIG. 4 is a schematic block diagram showing an embodiment of the present invention.

FIG. 4 is a schematic block diagram of an embodiment of the present invention.

At the front end of a cylinder 7 with a screw 1 inserted in, a nozzle 9 is attached, and at the back end portion of the cylinder 7, a hopper 15 for feeding resin pellets into the cylinder 7 is attached. The screw 1 has a check valve mechanism composed of a check valve 3, a check seat 4, etc., at the front end, and is driven to rotate by a screw-rotation servomotor 10, via a transmission mechanism 12. Further, the screw 1 is driven to move axially by an injection servomotor 11, via a transmission mechanism 13 and a translation mechanism 14, such as a ball screw/nut, for translating rotational motion into linear motion, thereby undergoing injection and back-pressure control. To the screw-rotation servomotor 10 and the injection servomotor 11, position-speed detectors 16, 17 for detecting rotational position-speed are attached, respectively, so that the rotational speed of the screw 1, the position of the screw 1 (position in the direction of the screw axis), and movement speed (injection speed) can be detected by these position-speed detectors. Further, a pressure sensor 18, such as a load cell, for detecting the pressure which melted resin exerts on the screw 1 in the direction of the screw axis is provided.

A control device 20 for controlling this injection molding machine includes a CNC CPU 22 which is a microprocessor for numerical control, a PC CPU 21 which is a microprocessor for a programmable controller, and a servo CPU 25 which is a microprocessor for servo control, connected by a bus 36.

The PC CPU 21 is connected with ROM 26 which holds sequence programs for controlling sequence operation of the injection molding machine, etc. and RAM 27 used to temporarily hold arithmetic data. The CNC CPU 22 is connected with ROM 28 which holds automatic operation programs for controlling the injection molding machine as a whole, etc., and RAM 29 used to temporarily hold arithmetic data.

The servo CPU 25 is connected with ROM 31 which holds servo-control-dedicated control programs for performing a position loop, a speed loop and a current loop, and RAM 32 used to temporarily hold data. The servo CPU 25 is further connected with a servo amplifier 34 for driving the screw-rotation servo motor 10 according to a command from the CPU 25, and a servo amplifier 35 for driving the injection servo motor 11 to move the screw axially, thereby carrying out injection, etc. Position-speed detectors 16, 17 are attached to the respective servomotors 10, 11, and output of the position-speed detectors 16, 17 is fed back to the servo CPU 25. The servo CPU 25 drive-controls the servo motors 10, 11 via the servo amplifies 34, 35, by performing position feedback-control and speed feedback-control, on the basis of move commands for respective axes fed from the CNC CPU 22 (to the screw-rotation servomotor 10 or the injection servomotor 11) and position and speed detected by and fed back from the position-speed detectors 16, 17, and also performing current feedback-control.

Further, resin pressure (resin pressure exerted on the screw) detected by the pressure sensor 18 and converted into a digital signal by an A/D converter 33 is fed to the servo CPU 25. Further, in order to detect the rotational force produced by back flow of resin and causing the rotation of the screw 1, a known disturbance observer is incorporated for drive control over the screw-rotation servomotor 10. Thus, the disturbance observer detects the force in the direction of rotation (rotational force) exerted on the screw 1.

It is to be noted that although servomotors, servo amplifiers, etc. for driving a mold clamping mechanism and an ejector mechanism are also provided, they are omitted in FIG. 4 since they do not have a direct relationship with the present invention.

A data input device 30 with a display device such as a liquid crystal display or a CRT is connected with the bus 36 via a display circuit 24. Further, a data storage RAM 23 made of nonvolatile memory is also connected with the bus 36, and molding conditions for injection molding, various set values, parameters, macro variables, etc. are stored in the data storage RAM 23.

With the configuration described above, the PC CPU 21 controls the sequence operation of the injection molding machine as a whole, the CNC CPU 22 distributes move commands to the servomotors for the respective axes on the basis of operation programs stored in the ROM 28, molding conditions stored in the data storage RAM 23, etc., and the servo CPU 25 performs so-called digital servo processing, namely, performs servo control including position loop control, speed loop control, current loop control, etc., on the basis of move commands distributed for the respective axes (to the servomotors for the respective axes, such as the screw-rotation servo motor 10, the injection servo motor 11, etc.), feedback signals indicative of positions and speeds detected by the position-speed detectors, etc., in the conventional manner.

The above-described configuration is not different from that of the conventional control device of the electric injection molding machine. The difference from the conventional control device lies in the provision of a function of adjusting the control condition for the screw reverse rotation process.

Figure 5:
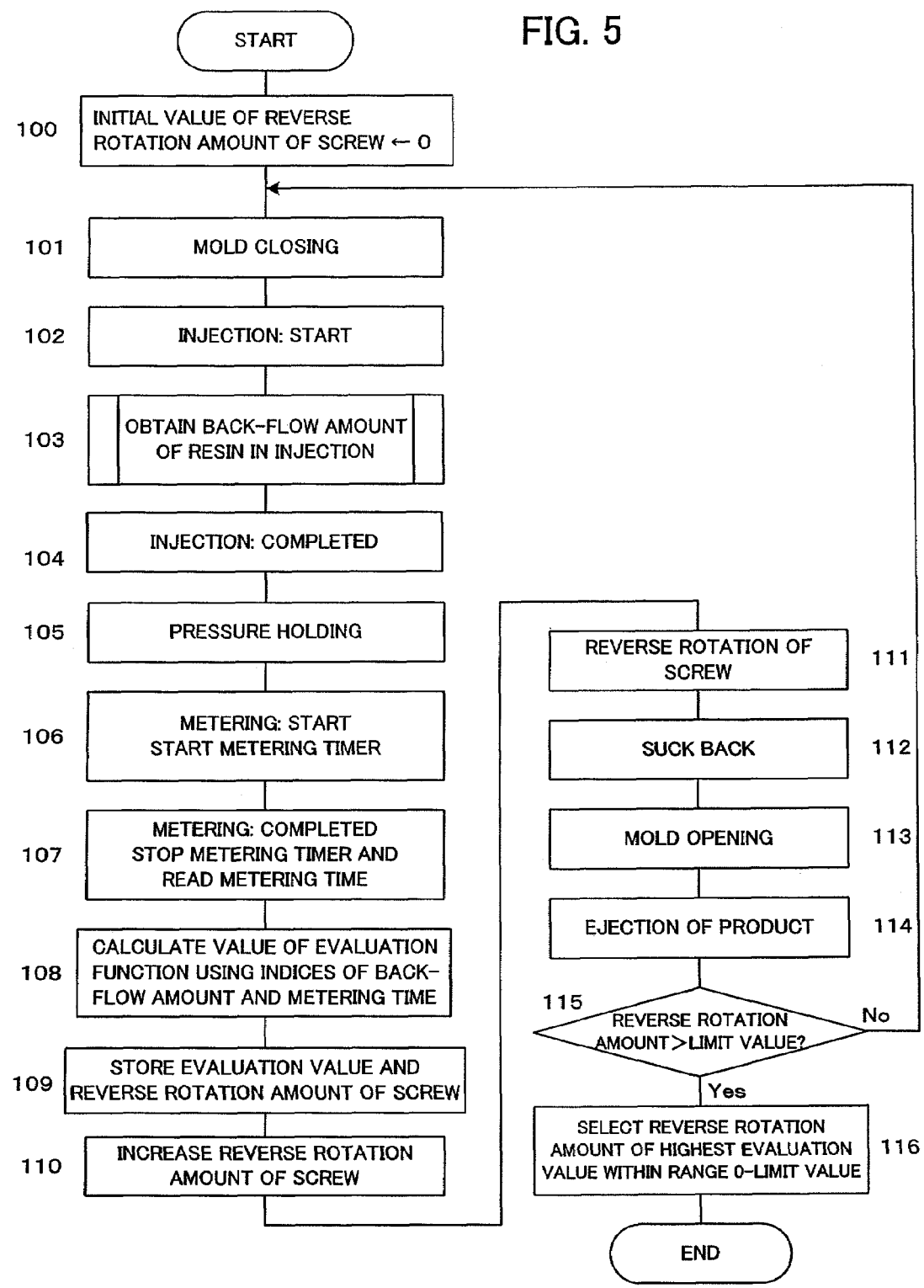
FIG. 5 is a flow chart showing an algorithm of adjustment of a control condition for a screw reverse rotation process in this embodiment.

FIG. 5 is a flow chart showing an algorithm of the function of adjusting the control condition for the screw reverse rotation process, performed by this control device.

First, the limit value of screw reverse rotation amount in the screw reverse rotation process, and the change (increment) in reverse rotation amount to be produced in each molding cycle are set. If the reverse rotation amount is changed simply by changing the reverse rotation angle though which the screw is rotated, the limit value is a maximum reverse rotation angle, and the change (increment) in reverse rotation angle to be produced in each molding cycle is set. If the reverse rotation amount is changed by changing reverse rotation speed while fixing reverse rotation time, the limit value is a maximum speed, and the change (increment) in reverse rotation amount to be produced in each molding cycle is an increment in speed. If the reverse rotation amount is changed by changing reverse rotation time while fixing reverse rotation speed, the limit value is a maximum reverse rotation time, and the change (increment) in reverse rotation amount to be produced in each molding cycle is an increment in reverse rotation time. Further, the time Ts which needs to have elapsed after the start of injection before injection pressure is detected, and the screw position xs which the screw needs to have reached when injection pressure is detected are set. Further, the coefficients of the evaluation function are set. For example, if the peak value of rotational force, which allows the back-flow amount to be obtained easily and more correctly, and the metering time are selected as input variables to be given to the evaluation function, the coefficients for the peak value of rotational force and the metering time of the evaluation function are set to specific values, while the coefficients for the other input variables are set to "0".

When a command ordering an adjustment of the control condition for the screw reverse rotation process is entered, the PC CPU 21 starts the processing of FIG. 5.

First, the reverse rotation amount is set to an initial value "0" (If the reverse rotation amount is changed simply by changing the reverse rotation angle, the reverse rotation angle is set to "0", if by changing the reverse rotation speed, the reverse rotation speed is set to "0", and if by changing the reverse rotation time, the reverse rotation time is set to "0") (Step 100), and a mold-clamping servomotor, not shown, is drive-controlled to perform a mold closing step (Step 101). The mold is closed until a set mold clamping force is produced, and then, an injection/pressure holding process is started. Specifically, the servo CPU 25 drive-controls the injection servomotor 11 via the servo amplifier 35, thereby moving the screw 1 forward (to the left in FIG. 4) and injecting the melted resin stored in front of the screw 1 within the cylinder 7, into the mold. During the injection in this injection/pressure holding process, the peak value of rotational force exerted on the screw (hereinafter referred to also as "screw rotational force") is detected, and also the physical amounts serving as indices of resin back-flow amount are detected (Step 103).

Figure 6:
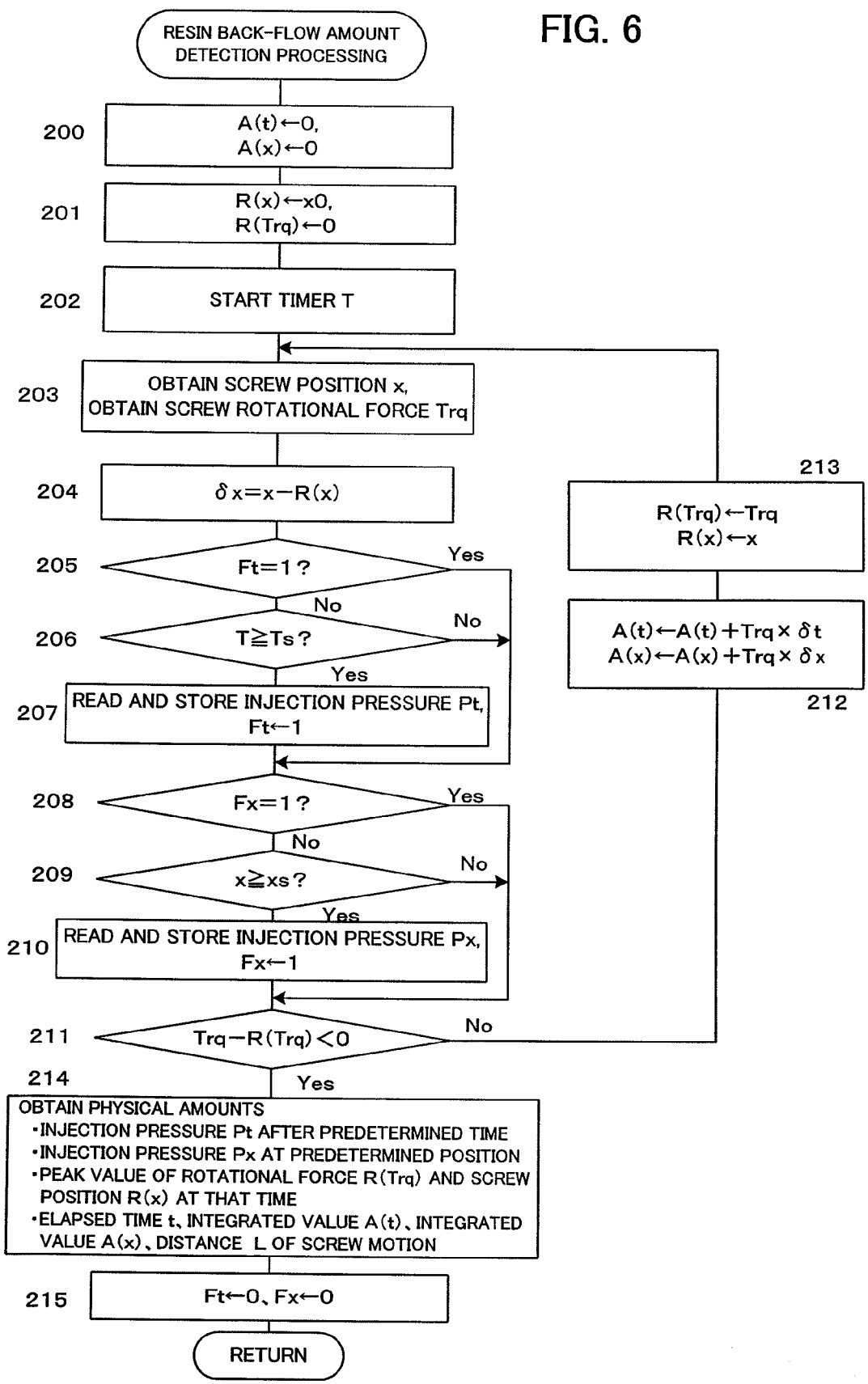
FIG. 6 is a flow chart showing an algorithm of detection of physical amounts serving as indices of resin back-flow amount in this embodiment.

The processing in Step 103, i.e., the step of detecting the physical amounts serving as indices of resin back-flow amount is shown in FIG. 6. At the same time as the forward motion of the screw 1 for injection is started, "0" is put into a register for storing the integrated value A(t) of the rotational force on the screw 1 with respect to time, and a register for storing the integrated value A (x) of the rotational force with respect to position of the screw (Step 200). Further, the screw position x0 at which the screw 1 is located at the start of the forward motion is read from a current position register and put into a register R(x), and "0" is put into a register R(Trq) for storing the rotational force Trq which the screw-rotation servomotor 10 receives (Step 201). Further, a timer T for measuring the time that has elapsed after the start of the screw forward motion is started (Step S202).

Then, the screw position (rotational position of the injection servomotor) x stored in the current position register and the screw rotational force Trq obtained by the disturbance observer are read (Step 203), and screw motion amount δx per sampling period is obtained by subtracting the screw position sampled in the previous sampling cycle and held in the register R(x) (initially "x0") from the screw position x sampled in the present sampling cycle (Step 204).

Next, whether the value of a flag Ft, which is provided to be set to "1" after the set time has elapsed so that injection pressure has been read, is "1" or not is determined (Step 205). If the flag value is "1", the flow of control goes to Step 208. If not, whether or not the time measured by the timer T has reached the set time Ts is determined (Step 206). If it has not reached the set time Ts, the flow of control goes to Step 208. If it has, the pressure value detected by the pressure sensor 18 at this time is stored as injection pressure Pt (Step 207), the flag Ft is set to "1", and then the flow of control goes to Step 208.

At Step 208, whether the value of a flag Fx, which is provided to be set to "1" after the screw has reached the set position so that injection pressure has been read, is "1" or not is determined. If the flag value is "1", the flow of control goes to Step 211. If not, whether or not the screw position x read at Step 203 has reached the set position xs is determined (Step 209). If it has not reached the set position xs, the flow of control goes to Step 211. If it has, the pressure value detected by the pressure sensor 18 at this time is stored as injection pressure Px (it is to be noted the injection pressure value stored depending on the screw position is denoted by Px, separately from the injection pressure value stored depending on the elapsed time, which is denoted by Pt) (Step 210), the flag Fx is set to "1", and then the flow of control goes to Step 211.

At Step 211, whether the value resulting from subtracting the screw rotational force sampled in the previous sampling cycle and held in the register R(Trq) (initially "0") from the screw rotational force Trq sampled at Step 203 in the present sampling cycle is negative or not is determined. As mentioned above, at the start of injection, resin flows backward and rotational force produced by this resin back flow is exerted on the screw 1, so that the screw rotational force Trq detected by the disturbance observer increases as shown in FIG. 3. Hence, at first, the result of determination at Step 211 is "No". Thus, the screw rotational force Trq detected at Step 203, multiplied by the sampling period δt is added to the value held in the register provided for holding the time-related integrated value A(t) of rotational force on the screw 1, thereby updating the time-related integrated value A(t) of rotational force on the screw 1, and then the screw rotational force Trq detected, multiplied by the motion amount δx per sampling period obtained at Step 204 is added to the value held in the register provided for holding the screw-position-related integrated value A(x) of rotational force on the screw 1, thereby updating the screw-position-related integrated value A(x) of rotational force on the screw 1 (Step 212).

Then, the screw rotational force Trq and the screw position x obtained at Step 203 are put into the register R(Trq) for holding the screw rotational force Trq and the register R(x) for holding the screw position x, respectively (Step 213), and then the flow of control goes back to Step 203. Then, Steps 203 to 213 are performed in sampling cycles until the result of determination at Step 211 becomes "Yes".

As mentioned above, the screw forward motion produces back flow of resin, so that the screw rotational force Trq increases as shown in FIG. 3. Then, when the check valve 3 becomes closed, the screw rotational force Trq decreases, so that the value obtained at Step 211 by subtracting the screw rotational force sampled in the previous sampling cycle and held in the register R(Trq) from the screw rotational force Trq sampled in the present sampling cycle becomes negative. At this time, it is determined that the screw rotational force Trq has reached a peak value, and the physical amounts to be obtained at the time when the peak value is detected are obtained. Thus, when it is determined that Trq−R(Trq)<0 at Step 211, the physical amounts are read and stored.

At the time when the peak value of the screw rotational force is detected, the injection pressure Pt after the set time Ts and the injection pressure Px at the set screw position xs have been already obtained, so that these injection pressures Pt and Px are stored as indices of resin back-flow amount. The value held in the register R(Trq) is stored as a peak value of the screw rotational force Trq, the value held in the register R(x) is stored as the screw position where the screw rotation force took the peak value, the value held in the register for holding the time-related integrated value A(t) of screw rotational force is stored as the time-related integrated value up to the time when the screw rotational force took the peak value, and the value held in the register for holding the screw-position-related integrated value A(x) of screw rotational force is stored as the screw-position-related integrated value up to the screw position where the screw rotation force took the peak value. When the result of determination at Step 211 becomes "yes", the value t held in the timer T provided for measuring the amount of time that has elapsed after the start of injection before the screw rotational force takes a peak value has exceeded the time that had elapsed before the screw rotational force took the peak value. Thus, the value resulting from subtracting the sampling period δt from the value t read from the timer T is stored as the time that had elapsed before the screw rotational force took the peak value.

Further, the distance L that the screw had moved after the start of the forward motion before the screw rotational force took the peak value, obtained by subtracting the screw forward motion start position x0 from the screw position held in the register R(x) is stored as a physical amount at the time the screw rotational force took the peak value (Step 214), and the flags Ft and Fx are set to "0" (Step 215), with which the resin back-flow amount detection processing ends.

After the physical amounts at the time when the screw rotational force took the peak value are stored in this manner, the flow of control returns to the main processing shown in FIG. 5. The injection is continued until the screw reaches an injection/pressure-holding switch position, and then the injection process is switched to the pressure holding process (Steps 104, 105).

After the pressure holding process is finished, a metering process is started and a timer for measuring the metering time is started. The metering process is performed in the conventional manner (Step 106). After the metering process is finished, the value held in the metering time timer is read and stored as the metering time (Step 107).

The evaluation value, i.e., the value of the evaluation function is calculated using the indices of back-flow amount obtained at Step 103 and the metering time obtained at Step 107 (Step 108), and the evaluation value obtained is stored in a manner connected with the metering time and the set value of reverse rotation amount (Step 109).

Next, the reverse rotation amount is increased by the set increment (in time or speed) (Step 110), and the screw is rotated reversely by the reverse rotation amount thus increased (Step 111). Then, a suck-back step is performed (Step 112), the mold is opened and the product molded is ejected (Steps 113, 114), with which one molding cycle ends. Then, whether the reverse rotation amount exceeds the set limit value or not is determined (Step 115). If not, the flow of control returns to Step 101, and Step 101 and the succeeding Steps are performed in the next molding cycle.

In this manner, Steps 101 to 115 are repeated as long as the reverse rotation amount does not exceed the limit value, and each time, at Step 109, the evaluation value is stored in the manner connected with the reverse rotation amount and the metering time.

When, at Step 115, it is determined that the reverse rotation amount has exceeded the limit value, the value of reverse rotation amount (reverse rotation angle, reverse rotation speed, or reverse rotation time) having the highest value in the evaluation values stored for the reverse rotation amounts within the range of 0 to the limit value is set as the reverse rotation amount for the screw reverse rotation process (Step 116), with which the adjustment of the control condition for the screw reverse rotation process is completed.

It is to be noted that when the value of the evaluation function reaches a plateau, as mentioned above, so that the evaluation function takes the highest value for a plurality of reverse rotation amounts, the smallest reverse rotation amount is selected as the reverse rotation amount for the screw reverse rotation process.

After the control condition for the reverse rotation process is set in this manner, the reverse rotation process in the molding cycle in the normal continuous molding is performed on the set control condition (reverse rotation amount). This normal molding cycle does not include Steps 100, 103, 108 to 110, 115 and 116 and does not need to include measuring of the metering time by the metering time timer at Steps 106 to 107. Thus, the molding cycle consisting of mold closing, injection, pressure holding, screw reverse rotation, sucking back, mold opening, and molded-product ejecting is performed.

As mentioned above, there are cases where, in order to facilitate the closure of the check valve, a pre-injection screw movement step, i.e., the step of moving the screw forward prior to the start of injection is added after the completion of metering. In this case, this pre-injection screw movement step is added before or after Step 111. When the pre-injection screw movement step is added, the above-described processing for obtaining the indices of resin back-flow amount can be performed when the screw is moved forward in the pre-injection screw movement step. In other words, the resin back-flow amount detection processing shown in FIG. 6, which is Step 103 of FIG. 5, is performed when the screw is moved forward in the pre-injection screw movement step added before or after Step 111. Needless to say, also when the pre-injection screw movement step is added, Step 103 (resin back-flow amount detection processing shown in FIG. 6) can be performed in the injection process as shown in FIG. 5.

As mentioned above, metering torque is an input variable to the evaluation function. In the above-described embodiment, however, metering torque is not measured and not used as an input variable to the evaluation function. When metering torque should also be used as an input variable to the evaluation function, the embodiment should be modified such that screw rotational force (metering torque) is sampled by the observer at specified intervals in the metering process at Steps 106 to 107 to obtain the average of screw rotational force for use as metering torque in the evaluation function. In this case, at Step 109, the evaluation value, i.e., the value of the evaluation function is calculated also using the metering torque thus obtained.

Only the variables to be used in calculating the value of the evaluation function need to be obtained. Thus, when the variables to be used in the evaluation function are determined, the embodiment is allowed to be modified such that only those variables are obtained. For example, if the input variables to the evaluation function are the peak value of rotational force and the metering time, Steps 202, 204 to 210, 212 and 215 in FIG. 6 are unnecessary. Thus, the embodiment is allowed to be modified such that only those variables necessary for evaluation using the evaluation function are obtained.

In the above-described manner, the optimal value of the control condition (reverse rotation amount) for the screw reverse rotation process which holds resin back-flow amount at a low level and does not result in a useless increase in metering time can be obtained and set. Thus, even when resin and/or mold is replaced and/or the molding conditions are changed, the reverse rotation amount (control condition) for the screw reverse rotation process can be set to an optimal value adapted to such replacement and/or change. Thus, the molding cycle can be always performed on the optimal value of the control condition (reverse rotation amount) for the screw reverse rotation process.

When the software for the above-described processing is installed in the control device of the injection molding machine, the adjustment of the control condition for the screw reverse rotation process can be performed automatically, as in the above-described embodiment. Alternatively, the adjustment of the control condition for the screw reverse rotation process can be performed manually by the user according to the above-described steps. The adjustment of the control condition for the screw reverse rotation process by manual operation is performed, for example, as follows: an evaluation value is obtained by setting the reverse rotation amount to a specified value and performing Steps 101 to 104, i.e., the molding cycle including the screw reverse rotation process. Next, the reverse rotation amount is changed (increased by a specified increment) and an evaluation value is obtained by performing the molding cycle in the same way. In this manner, evaluation values are obtained for the screw reverse rotation amount gradually changed (increased by the specified increment each time). All the evaluation values obtained are presented on the screen of the display device/input device to allow the reverse rotation amount corresponding to the highest evaluation value to be selected.

The above-described embodiment is an example of electric injection molding machine in which a screw rotation means for rotating the screw is an electric servo motor. The electric servo motor can, however, be replaced by an electric motor, a hydraulic motor or the like. Further, in the described embodiment, a disturbance observer is used as a means for detecting screw rotational force, so that the screw rotational force is obtained as load, or torque obtained by the observer. The screw rotational force can, however, be obtained from drive current supplied to the screw rotation servo motor, or hydraulic pressure supplied to the hydraulic motor. Alternatively, a strain sensor can be attached to the screw so that the screw rotational force is obtained from strain detected by the strain sensor.

What is claimed is:

1. An injection molding machine having a screw provided with a check valve, rotational drive means for driving the screw to rotate, axial drive means for driving the screw to move axially and rotational force detection means for detecting a rotational force exerted on the screw, and that performs a reverse rotation process of rotating the screw in a direction opposite to a direction of rotation of the screw in a metering process, on a control condition, after completion of the metering process and before start of an injection process, said injection molding machine comprising:

back-flow amount index detection means for detecting one or more physical amounts indicative of state of a molding operation and serving as indices of a back-flow amount of resin flowing backward through the check valve during a forward motion of the screw, evaluation value calculation means for obtaining an evaluation value by inputting the detected physical amounts as the indices of the back-flow amount to an evaluation function for evaluating the control condition of the reverse rotation process, and control condition selection means for repeating molding operations with a set value of the control condition of the reverse rotation process varied within a predetermined range, and selects a value of the control condition with which the highest evaluation value is obtained by said evaluation value calculation means, to be set for the reverse rotation processes in continuous molding operations.

2. An injection molding machine according to claim 1, wherein said back-flow amount index detection means detects one or more of physical amounts of: a peak value of the rotational force detected by said rotational force detection means during the forward motion of the screw, an integrated value of the rotational force with respect to time from the time when the screw starts the advancing motion to the time when the rotational force peaks, an integrated value of the rotational force with respect to a position of the screw from a position where the screw starts the advancing motion to a position where the rotational force peaks, the position of the screw, a distance of advancing motion of the screw from the start of the advancing motion to the position where the rotational force peaks, a time period from the time when the screw starts the advancing motion to the time when the rotational force peaks, a pressure exerted on the screw in a direction of backward motion of the screw when a predetermined time period elapses after the start of the forward motion of the screw, and a pressure exerted on the screw in the direction of backward motion of the screw when the screw is moved to a predetermined position, as the indices of the back-flow amount.

3. An injection molding machine according to claim 1, further comprising means for detecting at least one of a metering time period and a metering torque, wherein said evaluation value calculation means obtains an evaluation value by using detected values of the at least one of the metering time period and the metering torque as variables of the evaluation function in addition to the indices of back-flow amount.

4. An injection molding machine according to claim 2, further comprising means for detecting at least one of a metering time period and a metering torque, wherein said evaluation value calculation means obtains an evaluation value by using detected values of the at least one of the metering time period and the metering torque as variables of the evaluation function in addition to the indices of back-flow amount.

5. An injection molding machine according to claim 1, wherein the evaluation function is $$\sum_i a_i X_i^{b_i}$$

where $i \geq 1$, $a1 \neq 0$, $b1 \neq 0$, and X1 is an index of back-flow amount, or $$\prod_i X_i^{c_i}$$

where $i \geq 1$, $c1 \neq 0$, and X1 is an index of back-flow amount.

6. An injection molding machine according to claim 1, wherein the forward motion of the screw is performed for injection/pressure holding processes.

7. An injection molding machine according to claim 1, wherein the forward motion of the screw is performed between the completion of the metering process and the start of the injection process.

8. A method of adjusting a control condition of a reverse rotation process in an injection molding machine having a screw provided with a check valve, rotational drive means for driving the screw to rotate, axial drive means for driving the screw to move axially and rotational force detection means for detecting a rotational force exerted on the screw, and that performs the reverse rotation process of rotating the screw in a direction opposite to a direction of rotation of the screw in a metering process, on the control condition, after completion of the metering process and before start of an injection process, said method comprising the steps of:
(a) performing a molding cycle on the control condition of the reverse rotation process,
(b) detecting one or more physical amounts indicative of state of molding operation and serving as indices of a back-flow amount of resin flowing backward through the check valve during a forward motion of the screw,
(c) obtaining an evaluation value by inputting the detected physical amounts as the indices of the back-flow amount into an evaluation function,
(d) changing the control condition for the reverse rotation process, and
(e) repeating said steps (a) to (d) with a set value of the control condition for the reverse rotation process varied, and selecting a value of the control condition with which the highest evaluation value is obtained, to be set for the reverse rotation process.

9. A method of adjusting a control condition for a reverse rotation process in an injection molding machine according to claim 8, wherein said step (b) includes a step of detecting one or more physical amounts of: a peak value of the rotational force detected by said rotational force detection means during the forward motion of the screw, an integrated value of the rotational force with respect to time from the time when the screw starts the advancing motion to the time when the rotational force peaks, an integrated value of the rotational force with respect to a position of the screw from a position where the screw starts the advancing motion to a position where the rotational force peaks, the position of the screw, a distance of advancing motion of the screw from the start of the advancing motion to the position where the rotational force peaks, a time period from the time when the screw starts the advancing motion to the time when the rotational force peaks, a pressure exerted on the screw in a direction of backward motion of the screw when a predetermined time period elapses after the start of the forward motion of the screw, and a pressure exerted on the screw in the direction of backward motion of the screw when the screw is moved to a predetermined position, as the indices of the back-flow amount.

10. A method of adjusting a control condition of a reverse rotation process in an injection molding machine according to claim 8, further comprising a step of obtaining at least one of metering time and a metering torque, wherein said step (c) comprises a step of obtaining the evaluation value by using the at least one of the metering time period and the metering torque as variables of the evaluation function.

11. A method of adjusting a control condition of a reverse rotation process in an injection molding machine according to claim 9, further comprising a step of obtaining at least one of metering time and a metering torque, wherein said step (c) comprises a step of obtaining the evaluation value by using the at least one of the metering time period and the metering torque as variables of the evaluation function.

12. A method of adjusting the control condition for the reverse rotation process in the injection molding machine according to claim 8, wherein the evaluation function is $$\sum_i a_i X_i^{b_i}$$

where $i \geq 1$, $a1 \neq 0$, $b1 \neq 0$, and X1 is an index of back-flow amount, or $$\prod_i X_i^{c_i}$$

where $i \geq 1$, $c1 \neq 0$, and X1 is an index of back-flow amount.

13. A method of adjusting a control condition of a reverse rotation process in an injection molding machine according to claim 8, wherein said step (b) comprises a step of detecting the one or more physical amounts during the forward motion of the screw in the injection process/pressure holding process.

14. A method of adjusting a control condition for a reverse rotation process in an injection molding machine according to claim 8, wherein said step (b) comprises a step of detecting the one or more physical amounts during the forward motion of the screw performed between the completion of the metering process and the start of the injection process.

* * * * *